(12) United States Patent
Brørup

(10) Patent No.: US 8,411,566 B2
(45) Date of Patent: Apr. 2, 2013

(54) APPARATUS AND A METHOD FOR DISTRIBUTING BANDWIDTH

(75) Inventor: Morten Brørup, Herlev (DK)

(73) Assignee: Smart Share Systems APS, Herlev (DK)

( * ) Notice: Subject to any disclaimer, the term of this patent is extended or adjusted under 35 U.S.C. 154(b) by 267 days.

(21) Appl. No.: 11/980,446

(22) Filed: Oct. 31, 2007

(65) Prior Publication Data

US 2009/0110000 A1 Apr. 30, 2009

(51) Int. Cl.
*G01R 31/08* (2006.01)

(52) U.S. Cl. .......... 370/231; 370/229

(58) Field of Classification Search .......... 709/226; 370/229, 231; 710/113
See application file for complete search history.

(56) References Cited

U.S. PATENT DOCUMENTS

| | | | | |
|---|---|---|---|---|
| 5,719,872 A * | 2/1998 | Dubberly et al. | ............ | 370/487 |
| 6,026,075 A * | 2/2000 | Linville et al. | ............ | 370/236 |
| 6,118,791 A * | 9/2000 | Fichou et al. | ............ | 370/468 |
| 6,324,184 B1 * | 11/2001 | Hou et al. | ............ | 370/468 |
| 6,349,088 B1 * | 2/2002 | Ginzboorg et al. | ............ | 370/230 |
| 6,424,624 B1 * | 7/2002 | Galand et al. | ............ | 370/231 |
| 6,434,164 B1 * | 8/2002 | Matsunaga et al. | ............ | 370/443 |
| 6,657,958 B1 * | 12/2003 | Tanaka | ............ | 370/230.1 |
| 6,680,907 B1 * | 1/2004 | Bonaventure | ............ | 370/229 |
| 6,687,224 B1 * | 2/2004 | Ater et al. | ............ | 370/230 |
| 6,687,781 B2 * | 2/2004 | Wynne et al. | ............ | 710/317 |
| 6,754,221 B1 * | 6/2004 | Whitcher et al. | ............ | 370/401 |
| 6,789,190 B1 * | 9/2004 | Cohen | ............ | 713/160 |
| 6,934,253 B2 * | 8/2005 | Hoogenboom et al. | ............ | 370/232 |
| 7,047,564 B2 * | 5/2006 | Cohen | ............ | 726/23 |
| 7,523,497 B2 * | 4/2009 | Cohen | ............ | 726/22 |
| 7,532,642 B1 * | 5/2009 | Peacock | ............ | 370/468 |
| 7,680,036 B2 * | 3/2010 | Yang et al. | ............ | 370/229 |
| 7,952,997 B2 * | 5/2011 | Corwin et al. | ............ | 370/229 |
| 2002/0071387 A1 * | 6/2002 | Horiguchi et al. | ............ | 370/229 |
| 2002/0174279 A1 * | 11/2002 | Wynne et al. | ............ | 710/113 |
| 2002/0181401 A1 * | 12/2002 | Hagirahim et al. | ............ | 370/236 |
| 2003/0058793 A1 * | 3/2003 | Rochon et al. | ............ | 370/229 |
| 2003/0084317 A1 * | 5/2003 | Cohen | ............ | 713/200 |
| 2003/0103450 A1 * | 6/2003 | Chapman et al. | ............ | 370/229 |
| 2003/0123390 A1 * | 7/2003 | Takase et al. | ............ | 370/230.1 |
| 2003/0163593 A1 * | 8/2003 | Knightly | ............ | 709/251 |
| 2003/0189934 A1 * | 10/2003 | Jeffries et al. | ............ | 370/395.4 |
| 2003/0229720 A1 * | 12/2003 | Kiremidjian et al. | ............ | 709/253 |

(Continued)

FOREIGN PATENT DOCUMENTS

WO WO 2004/112323 12/2004

OTHER PUBLICATIONS

M. Kaul et al., "Intelligent Packet Shaper to Avoid Network Congestion for Improved Streaming Video Quality at Clients," *Proc. 2003 IEEE Int'l Symp. on Computational Intelligence*, Kobe Japan pp. 988-993 (Jul. 16-20, 2003).

*Primary Examiner* — Firmin Backer
*Assistant Examiner* — Michael A Chambers
(74) *Attorney, Agent, or Firm* — Harness, Dickey & Pierce, P.L.C.

(57) ABSTRACT

A method and an apparatus for distributing bandwidth, on one or more first ports having a maximum bandwidth, the bandwidth usage being monitored and compared to a percentage of the maximum bandwidth. If the bandwidth usage at the first port(s) exceeds the percentage, a bandwidth of data received on the first port(s) and forwarded to a local user on one or more second port(s) being reduced so as to reduce the bandwidth of the data at the first port(s).

17 Claims, 3 Drawing Sheets

U.S. PATENT DOCUMENTS

| | | | |
|---|---|---|---|
| 2004/0071162 A1* | 4/2004 | Bellows | 370/468 |
| 2004/0076173 A1* | 4/2004 | Marchetto | 370/447 |
| 2004/0143663 A1* | 7/2004 | Leedom et al. | 709/226 |
| 2004/0196790 A1* | 10/2004 | Balakrishnan et al. | 370/232 |
| 2004/0203825 A1* | 10/2004 | Daniel et al. | 455/452.1 |
| 2004/0230839 A1* | 11/2004 | Cohen | 713/201 |
| 2004/0233912 A1* | 11/2004 | Droz et al. | 370/395.21 |
| 2004/0246895 A1* | 12/2004 | Feyerabend | 370/229 |
| 2005/0276263 A1* | 12/2005 | Suetsugu et al. | 370/389 |
| 2006/0034330 A1* | 2/2006 | Iwamura | 370/468 |
| 2006/0120282 A1* | 6/2006 | Carlson et al. | 370/229 |
| 2006/0176808 A1* | 8/2006 | Isobe et al. | 370/229 |
| 2006/0209702 A1* | 9/2006 | Schmitt et al. | 370/252 |
| 2006/0253883 A1* | 11/2006 | Giammaressi | 725/95 |
| 2008/0117869 A1* | 5/2008 | Freen et al. | 370/329 |

* cited by examiner

APPARATUS AND A METHOD FOR DISTRIBUTING BANDWIDTH

This invention relates to a bandwidth distributor which dynamically adjusts bandwidth limiters based on available bandwidth. This is particularly efficient in a network with limited bandwidth.

The general state of the art bandwidth distributors provide either bandwidth limiters with fixed settings or settings that are dynamically adjusted based on the bandwidth historically used by each output port.

An object of the present invention is to implement a bandwidth distributor which adjusts the bandwidth limiters based on the relationship between available and used input bandwidth.

A particular advantage of the present invention is a significantly improved bandwidth distribution where the output ports are not excessively bandwidth limited when input bandwidth is available.

A particular feature of the present invention is the provision of a bandwidth controller, which adjusts the bandwidth limiters based on comparing the measured or estimated passing bandwidth to a predetermined bandwidth.

In a first aspect, the invention relates to an apparatus for distributing bandwidth, the apparatus comprising:
  one or more first port(s) for receiving data from external entities, the first port(s) having a total reception bandwidth maximum,
  one or more second port(s) for sending data received by the first port(s) to local users,
  means for determining a bandwidth with which the first port(s) receive data from the external entities and for comparing the bandwidth to the total reception bandwidth maximum of the first port(s), and
  means for, if the determined bandwidth exceeds a predetermined percentage, being lower than 100%, of the total reception bandwidth maximum of the first port(s), controlling the second port(s) to reduce a bandwidth with which they send data transmitted under the TCP protocol to the local user(s).

In the present context, an external entity may be a server, web site, computer, proxy server, or any group thereof, such as connected to each other and the apparatus via the WWW, LAN, WAN or in any other manner, wirelessly and/or via wires/optical guides.

Also, a local user need not be a desk top PC but may be any number of computers, users, PCs, servers, or the like. In this context, the "local" preferably means that the user is positioned physically closer to the apparatus than the external entities, but this is not a requirement.

It is clear that the apparatus may have any number of first ports for receiving the data from the external entities. The ports may be virtual or physical, and the number of ports may be selected on the basis of any strategy or for any reason at all. In one example, what could be received on a single port may be distributed via multiple ports in order to balance the load of the ports. This is common in the networking industry.

Also, any number of second ports may be provided. A single port at the apparatus may in another position be distributed to a plurality of users such as via a switch. Thus, also in this connection, the number of ports may be selected, and the ports may be virtual and/or physical.

Any port and any number of ports normally will have a maximum reception (and transmission) bandwidth which is defined/limited either by hardware (or software) of the port of the actual apparatus or of the link or connection to which the port is connected. Thus, a port having a maximum hardware reception capability of 100 Mbit/sec, but which is connected to other hardware or a link, which is not able to deliver more than 5 Mbit/sec, will in the present context have a maximum reception bandwidth of 5 Mbit/sec. Alternatively, a 5 Mbit/sec port connected to a 100 Mbit/sec network will still only have a maximum bandwidth of 5 Mbit/sec as the port's own limit is then reached.

Thus, one or more local users will communicate with (receive data from) external entities by each local user receiving data from one or more of the second port(s) and each external entity transmitting data to one or more of the first port(s). The data is then switched/routed inside the apparatus between the first and second port(s).

Usually, the external entities and the local users will have a combined transmission/reception bandwidth much higher than that of the first port(s), whereby a problem may be encountered at the first port(s) in that the bandwidth thereof may limit the overall communication of the system. Determining this situation is not difficult when the maximum bandwidth of the first port(s) is known, but a problem is encountered in this situation in that it is not readily determinable whether the overall desired bandwidth via the first port(s) is only slightly higher than the maximum bandwidth of the first port(s) or if it is much higher, and it is also not determinable which of the local users and/or external entities does not obtain the bandwidth desired or obtainable, as it is not simple to determine with which additional bandwidth an external entity may forward the data being forwarded.

The first problem is solved by allowing only a non-100% utilization of the maximum bandwidth of the first port(s), in that when this bandwidth is exceeded, congestion is assumed/determined, and the reduction of bandwidth usage is performed (see further below).

In the situation where different local users have rights to (such as having paid for) different bandwidths, it may be desirable to ensure that a given local user is ensured the desired/required/purchased bandwidth, if the user so desires. However, if the first port(s) is/are at their maximum bandwidth, it is not easily determined whether any external entities transmitting data to this local user are able to transmit at a higher bandwidth but are blocked from doing so by the congested first port(s).

In this relation, it is noted that the data transmitted on networks (private, corporate, local, WANs, LANs, nationwide or international) may be forwarded on a number of different protocols, some of which are public and generally accessible and others of which are proprietary. Some protocols are based on other protocols in addition to which additional functionality is added. An example is a protocol based on UDP but which has been added a control channel to ensure that the receiver and transmitter are informed of the bandwidth/amount of data forwarded and received.

In addition, the first and the second ports may be communicating using the same or different protocols or types of information. In one situation, the second port(s) are connected to a LAN on which Ethernet communication takes place, normally at bandwidths of between 10 Mbit/sec to 10 Gbit/sec, whereas the first port(s) may be communicating on an ADSL line.

It has been found, however, that the TCP protocol offers advantages in the present context in that the receiver (such as a local user downloading data from an external entity) will inform the transmitter (the external entity) of the bandwidth at which the receiver receives data. In the case where the transmitter then transmits with a higher bandwidth, it will reduce the transmission bandwidth.

Naturally, this may also be the case for other protocols based on the TCP protocol. Such other protocols may provide additional functionality to that of the TCP protocol, but this is acceptable.

Consequently, it has been found that due to the operation of the TCP protocol, it is possible to control the bandwidth with which the external entities forward data to the first port(s) at least under this protocol, by simply reducing or controlling the bandwidth with which this data is forwarded from the second port(s) to the local user receiving the data. In this manner, the bandwidth usage on the first port(s) may be controlled.

In one embodiment, the controlling means are adapted to control the bandwidth of data transmitted from the second port(s), and in another embodiment, the apparatus further comprises means for transferring data from the first port(s) to the second port(s), the controlling means being adapted to control a bandwidth with which the data transmitted under the TCP protocol is transmitted from the first port(s) to the second port(s).

In addition, the determining means is preferably adapted to determine the bandwidth at regular intervals or constantly, and wherein the controlling means is adapted to perform the controlling at regular intervals or constantly. Thus, the determining/controlling means may be adapted to perform these actions one or several times per minute or second, such as with a frequency of 10, 20, 30, 40, 50 Hz or more.

Another aspect of the invention relates to an apparatus for distributing bandwidth, the apparatus comprising:
- one or more first port(s) for receiving data from and sending data to external entities, the first port(s) having a total reception bandwidth maximum,
- one or more second port(s) for sending data received by the first port(s) to local users and receiving data from local users to be sent by the first port(s),
- means for determining a bandwidth with which the first port(s) receive data from the external entities and for comparing the bandwidth to the total reception bandwidth maximum of the first port(s), and
- means for, if the bandwidth exceeds a predetermined percentage, being lower than 100%, of the total reception bandwidth maximum of the first port(s), controlling the second port(s) to reduce a bandwidth with which they send data transmitted under the TCP protocol to the local user(s).

In this connection, a port (first or second) may be a physical port, such as provided with a PHY and e.g. a RJ45/firewire/USB connector or a wireless transceiver, or may again be bundled with other ports or may be virtual ports of the apparatus.

Naturally, the determination and controlling may be performed by the same or different circuits/processors and all parts of the apparatus may be made in one or more processors with suitable programming or in special purpose hardware, or in any combination thereof.

In one embodiment, the apparatus further comprises means for transferring data from the first port(s) to the second port (s), the controlling means being adapted to control a bandwidth with which the data transmitted under the TCP protocol is transmitted from the first port(s) to the second port(s).

In addition, as mentioned above, the determining means is preferably adapted to determine the bandwidth at regular intervals or constantly, and wherein the controlling means is adapted to perform the controlling at regular intervals or constantly.

Naturally, the reducing means and reducing step may be performed in all TCP data or only data relating to one or more local users, depending on different situation. In one situation, different local users have different bandwidth desires/requirements, and information relating to the desired/required/purchased bandwidth for the individual local users may be stored and used for the controlling means/step. Thus, if the bandwidth at the first port(s) exceeds the limit, it may be determined that one user requiring/desiring does not get this bandwidth and that another user utilizes more than his/her required/desired/purchased bandwidth. In that situation, any TCP data (or data carried on a protocol based on TCP) to the other user may be reduced in order to have the pertaining external entity reduce the bandwidth of such TCP data to the first port(s).

Naturally, this controlling may be performed for each port individually or for collections of ports, if desired.

In general, the predetermined percentage may be 99.99% or lower, such as 99.9% or lower, such as 99% or lower, such as 95% or lower, such as 90% or lower, such as 80% or lower, such as 55% or lower.

A third aspect of the invention relates to a method of distributing bandwidth, the method comprising the steps of:
- one or more first port(s) receiving data from external entities, the first port(s) having a total reception bandwidth maximum,
- one or more second port(s) sending data received by the first port(s) to local users,
- determining a bandwidth with which the first port(s) receive data from the external entities and comparing the bandwidth to the total reception bandwidth maximum of the first port(s), and
- if the bandwidth exceeds a predetermined percentage, being lower than 100%, of the total reception bandwidth maximum of the first port(s), reducing a bandwidth with which data transmitted under the TCP protocol is sent from the second port(s) to the local user(s).

Preferably, the reducing step comprises reducing a bandwidth with which the data transmitted under the TCP protocol is sent from the first port(s) to the second port(s).

Also, preferably, the determining step comprises determining the bandwidth at regular intervals or constantly, and wherein the controlling step comprises performing the controlling at regular intervals or constantly.

A fourth aspect of the invention relates to a method of distributing bandwidth, the method comprising the steps of:
- one or more first port(s) receiving data from and sending data to external entities, the first port(s) having a total reception bandwidth maximum,
- one or more second port(s) sending data received by the first port(s) to local users and receiving data from local users to be sent by the first port(s),
- determining a bandwidth with which the first port(s) receive data from the external entities and comparing the bandwidth to the total reception bandwidth maximum of the first port(s), and
- if the bandwidth exceeds a predetermined percentage, being lower than 100%, of the total reception bandwidth maximum of the first port(s), reducing a bandwidth with which data, transmitted under the TCP protocol is transmitted from the second ports.

Again, preferably, the reducing step comprises reducing a bandwidth with which the data transmitted under the TCP protocol is send from the first port(s) to the second port(s).

Also, preferably, the determining step comprises determining the bandwidth at regular intervals or constantly, and wherein the controlling step comprises performing the controlling at regular intervals or constantly.

Even though, as is mentioned above, a behaviour desirable in the present context is brought about by the well-known TCP protocol, the overall functionality of the invention may be obtained in a number of manners using any desired protocol, possibly provided with additional functionality. It is well-known that protocols may be provided with additional functionality in order to operate under certain circumstances, and a large number of the present protocols, such as those used for streaming (Flash players, Windows® media player, Real® player), may have this behaviour.

Thus, in a fifth aspect, the invention relates to an assembly of:
- an apparatus comprising:
  - one or more first port(s) for receiving data from one or more external entities, the first port(s) having a total reception bandwidth maximum,
  - one or more second port(s) for sending data received by the first port(s) to one or more local users,
- a predetermined local user, and
- a predetermined external entity, wherein:
- the local user is adapted to transmit, to the predetermined external entity, information indicating a bandwidth with which the predetermined local user receives data from the predetermined external entity,
- the predetermined external entity is adapted to receive the information and forward data to at least one of the first port(s) with a bandwidth determined by the indicated bandwidth,
- the apparatus comprising:
  - means for determining a bandwidth with which the first port(s) receive data from the external entities and comparing the bandwidth to the total reception bandwidth maximum of the first port(s), and
  - means for, if the bandwidth exceeds a predetermined percentage, being lower than 100%, of the total reception bandwidth maximum of the first port(s), reducing a bandwidth with which data received at the first port(s) from the predetermined external entity is forwarded to the predetermined local user via one or more of the second ports.

Thus, during a transmission of data from an external entity to a local user, the local user will inform (such as at regular intervals or when changes occur) the external entity of a bandwidth at which the local user receives the data, and the external entity will adapt the transmission bandwidth thereto.

Naturally, this scheme may be amended so that the external entity at intervals (or always) attempts to increase the bandwidth in order to utilize available bandwidth and not be detrimentally affected by a temporary bandwidth shortage. Also, the information transmitted may take any of a large number of forms (ranging from sending a complete copy of all data received to simply sending information relating to a reception bandwidth, a point in time of having received data (a predetermined amount or the like), or identification of data received).

In one example, the local user is adapted to provide the information if the reception bandwidth is higher than an agreed or desired reception bandwidth, in order to have the external entity reduce the bandwidth to that desired or agreed. This situation may be one where it is desired that a download of data does not block other data downloads, which may be controlled by fixing or setting a maximum download (reception) bandwidth.

Also, the external entity's adaptation of the transmission bandwidth need not be an adaptation to the actual reception bandwidth but may simply be a reduction or increase in a direction toward the reception bandwidth. It may be desired to always attempt a slightly higher bandwidth than the indicated reception bandwidth in order to utilize any available bandwidth. Numerous manners of implementing this feed-back loop exist.

Preferably, the apparatus further comprises means for transferring data from the first port(s) to the second port(s), the reducing means being adapted to reduce a bandwidth with which the data received from the predetermined external entity is transmitted from the first port(s) to the second port(s). As mentioned above, an alternative would be to provide the reduction at the second port(s).

Also, preferably, the determining means is adapted to determine the bandwidth at regular intervals or constantly, and wherein the reducing means is adapted to perform the reduction at regular intervals or constantly.

A sixth and final aspect of the invention relates to a method of distributing bandwidth, the method comprising the steps of:
- a local user communicating with an external entity via an element having:
  - one or more first port(s) receiving data from at least the external entity, the first port(s) having a total reception bandwidth maximum, and
  - one or more second port(s) sending data received by the first port(s) to at least the local user,
- the local user transmitting to the external entity information indicating a bandwidth with which the local user receives data from the external entity,
- the external entity receiving the information and forwarding data to at least one first port with a bandwidth determined by the indicated bandwidth,
- determining a bandwidth with which the first port(s) receive data from the external entities and comparing the bandwidth to the total reception bandwidth maximum of the first port(s), and if the bandwidth exceeds a predetermined percentage, being lower than 100%, of the total reception bandwidth maximum of the first port(s), reducing a bandwidth with which data received at the first port(s) from the external entity is forwarded to the user via one or more of the second ports.

In a preferred embodiment, the method further comprises the step of transferring data from the first port(s) to the second port(s), the reducing step comprising reducing a bandwidth with which the data received from the predetermined external entity is transmitted from the first port(s) to the second port(s).

In a preferred embodiment, the determining step comprises determining the bandwidth at regular intervals or constantly, and wherein the reducing step comprises performing the reduction at regular intervals or constantly.

A preferred unit/apparatus of this type may comprise:
- one or more physical input ports
- a logical input port
- an optional input traffic translator
- a traffic distributor
- multiple logical output ports
- one or more physical output ports
- an output traffic translator on each or some or none of the logical output ports
- a bandwidth limiter on each or some of the logical output ports
- a bandwidth controller in addition to either:
- a bandwidth measurer on the logical input port or either a bandwidth measurer or a bandwidth limiter (or both) on each of the logical output ports (individually per output port)

wherein:

the logical input port receives all the input traffic from one or more of the physical input ports; the input traffic comprising of packets, optionally with attached information, such as the physical port where the packet arrived.

the optional input traffic translator translates each packet in the input traffic according to its configured translation rules. The translation rules of the optional input traffic translator is controlled by outside parameters. A translation rule could be such as to not change anything in the packet, such as to change the destination IP address and TCP port in the packet depending on the original destination IP address and TCP port in the packet, such as to add a VLAN tag depending on the physical input port where the packet arrived.

the traffic distributor distributes the traffic arriving on the logical input port (after it has been translated by the optional input traffic translator, if present) among the logical output ports according to its configured distribution rules. The distribution rules of the traffic distributor is controlled by outside parameters. A distribution rule could be such as to determine the logical output port of each packet in the traffic depending on the contents of the packet, such as the destination IP address, such as the destination MAC address. A distribution rule could be such as to determine the logical output port of each packet in the traffic depending on information attached to the packet by the optional traffic input translator.

each output traffic translator translates each packet in the logical port's output traffic according to its configured translation rules. The translation rules of each output traffic translator is controlled by outside parameters. A translation rule could be such as to not change anything in the packet, such as to change the destination IP address and TCP port in the packet depending on the contents of the packet. A translation rule could be such as to add a VLAN tag to the packet depending on information attached to the packet by the traffic distributor.

each logical output port transmits its traffic on a physical output port, which may transmit traffic from one or more logical ports.

a physical port may be an antenna, an RJ45 connector, a fibre connector or any other kind of connection to any kind of transport medium.

the physical input ports and the physical output ports need not be separate physical ports.

the bandwidth controller uses the passing bandwidth to determine the settings of the bandwidth limiters of the logical output ports. The bandwidth controller periodically compares the passing bandwidth to a predetermined value. When the passing bandwidth is below the predetermined value, the bandwidth controller increases the setting on all or some of the limiters. When the passing bandwidth is above the predetermined value, the unit decreases the setting on all or some of the limiters. The predetermined value is typically set to the maximum available bandwidth provided on the logical input port minus a small value, such as 0.01%, such as 0.1%, such as 1%, such as 5%, such as 10%, such as 20%, such as 45%. The bandwidth limiters are typically traffic shapers, such as tail-drop shapers, such as RED shapers. And the passing bandwidth being e.g. either:

the bandwidth measured on the logical input port.

or:

an estimate, which is calculated as the sum of the bandwidth measured on each of the logical output ports with a bandwidth measurer plus the sum of the setting of the bandwidth limiter on each of the logical output ports without a bandwidth measurer.

The invention is particularly preferred when the total output bandwidth is significantly higher than the total input bandwidth, such as 2 times higher, such as 10 times higher, such as 1000 times higher.

In the following, a preferred embodiment of the invention will be described with reference to the drawing.

DETAILED DESCRIPTION OF THE PRESENT INVENTION

Figure 1:
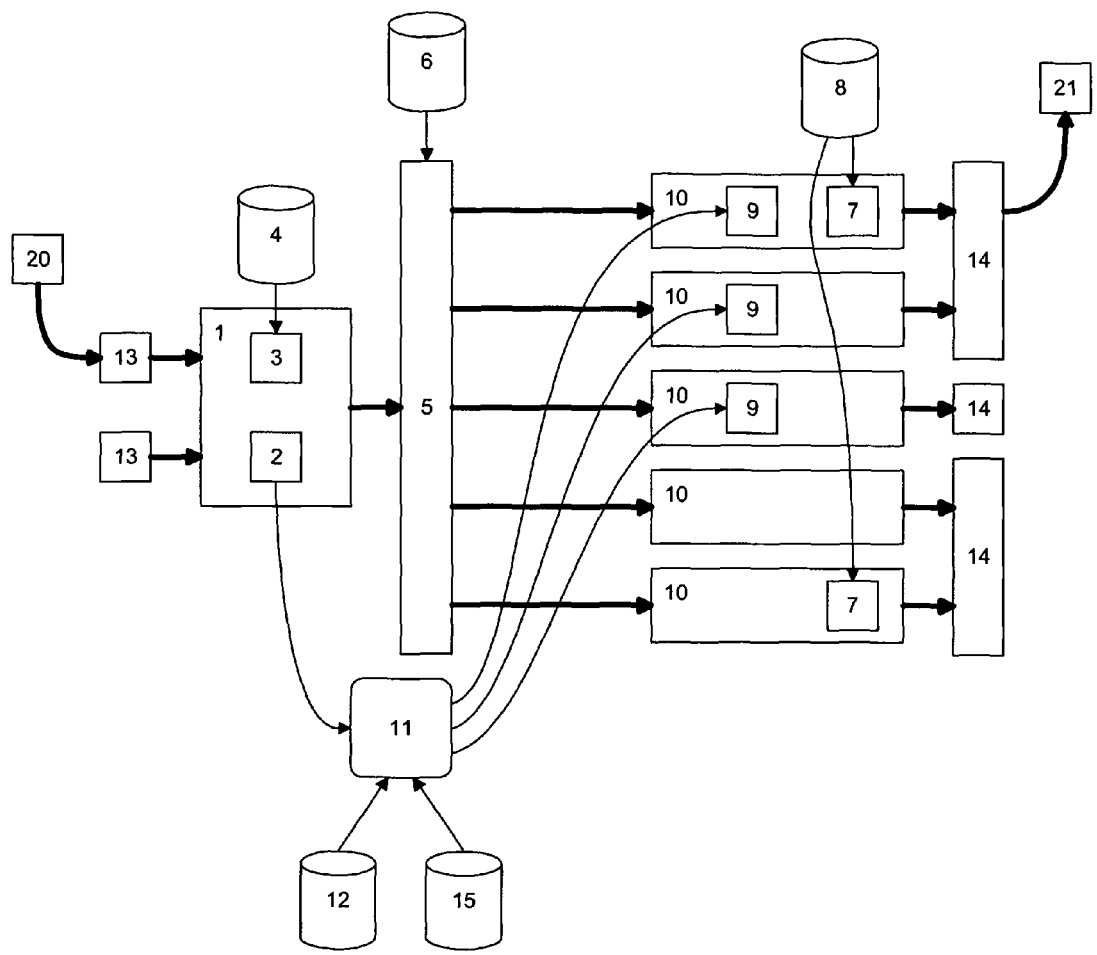
FIG. 1 shows a block diagram of the network bandwidth distributor where output bandwidth limiters are adjusted based on the measured input bandwidth.

FIG. 1 shows a block diagram of an example embodiment of the network bandwidth distributor where the measured input bandwidth is used as basis for adjusting the output bandwidth limiters.

Traffic arriving at the physical input ports 13 flows into the logical input port 1, which contains a bandwidth measurer 2 and an input traffic translator 3. Any number of physical input ports may be present; in this example, two are present.

The bandwidth measurer 2 measures the traffic passing the logical input port 1.

The input traffic translator 3 modifies the traffic passing through the logical input port 1 according to the input traffic translation parameters 4.

After passing the logical input port 1, the traffic flows through the traffic distributor 5, which distributes the traffic to the logical output ports 10 according to the traffic distribution rules 6. Any number of logical output ports may be present; in this example, five are present.

Some of the logical output ports 10 contain a bandwidth limiter 9, which limits the outgoing traffic bandwidth as instructed by the bandwidth controller 11. Any number of the logical output ports may contain a bandwidth limiter; in this example, three of them do.

Some of the logical output ports 10 contain an output traffic translator 7, which modifies the traffic passing through the logical output port 10 according to the output traffic translation parameters 8. Any number of the logical output ports may contain an output traffic translator; in this example, two of them do.

Traffic flowing out of the logical output ports 10 leave at the physical output ports 14. Any number of physical output ports may be present, and any number of the logical output ports may be connected to each of the physical output ports; in this example, three physical output ports exist, where two of them each have two logical output ports connected it and the third has one logical output port connected to it.

The bandwidth controller 11 periodically compares the bandwidth measured at the logical input port 1 by the bandwidth measurer 2 to the predetermined bandwidth 12.

When the bandwidth measured by the bandwidth measurer 2 is above the predetermined bandwidth 12, the bandwidth controller 11 may decrease the bandwidth of some or all of the bandwidth limiters 9.

When the bandwidth measured by the bandwidth measurer 2 is below the predetermined bandwidth 12, the bandwidth controller 11 may increase the bandwidth of some or all of the bandwidth limiters 9.

The bandwidth controller 11 has a list of maximum bandwidth settings 15, which determines the maximum bandwidth the bandwidth controller 11 sets in each listed bandwidth limiter 9.

When wishing to limit the bandwidth of data received on ports 13 but not being able to act outside the ports 13/14, it has been found that the TCP protocol is useful in that, when a local user 21 connected to a port 14 receives data received at a port 13 from an external entity 20, this local user 21 will (under the TCP protocol) inform the external entity 20 of the bandwidth (or amount) of data received, and if this bandwidth is reduced, the external entity 20 will reduce the bandwidth with which it transmits data to the port 13.

Thus, if the bandwidth measurer 2 determines that the bandwidth utilization of the ports 13 exceeds the above-mentioned percentage of the maximum bandwidth, it may be determined which local user 21 or which port 14 receives too much data (using bandwidth settings described further below), TCP data received at the first port 13 and transmitted to the second port 14 for transmission to the user 21, may have its bandwidth reduced in order to (via the TCP protocol) force the pertaining external entity 20 to reduce the bandwidth of transmission.

Naturally, this behaviour may be obtained using any desired protocol optionally provided with additional functionality, in order to have the local user(s) 21 inform the external entities 20 (at least that or those from which they receive certain types of data) of a bandwidth with which they receive data from the entity 20. Then, the entity 20 will adapt its transmission bandwidth accordingly (such as reduce the transmission bandwidth if it is much higher than the reception bandwidth—according to any desired scheme), in order for the present method to be able to control the bandwidth of data received at the ports 13 by merely adapting the bandwidth of data flows between the ports 13 and 14—or of data transmitted by the ports 14.

Naturally, the local user may be any type of computer, processor, controller or a group thereof, as may the external entity.

The above functionality of the local user and the external entity may be built-in into the communication protocol, such as the TCP protocol, or may use another protocol having the same behaviour. Alternatively, this behaviour may be obtained by providing, in addition to the data transmission, transmission of other data and information in order to have the local user and the external entity behave as described. This additional behaviour may additionally or alternatively be obtained using the existing processing elements of the local user and/or the external entity, such as using/running additional software, or may be obtained using special-purpose hardware, such as a processor running special-purpose software, or a hardwired circuit.

The input traffic translator 3 with its input traffic translation parameters 4 is optional.

The output traffic translator 7 with its output traffic translation parameters 8 is optional for each logical output port 10.

The bandwidth limiter 9 is optional for each logical output port 10.

The list of maximum bandwidth settings 15 is optional.

Figure 2:
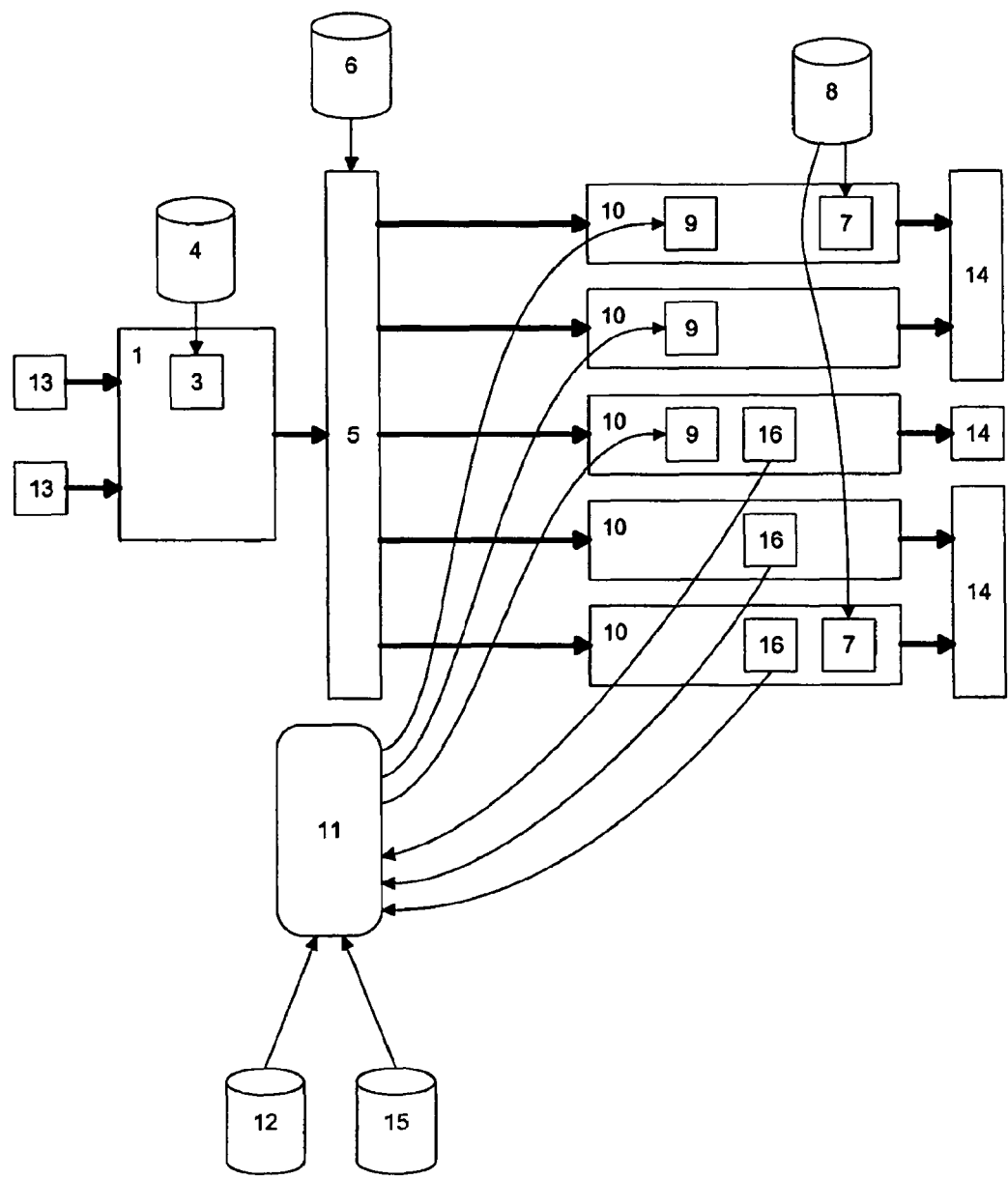
FIG. 2 shows a block diagram of the network bandwidth distributor where output bandwidth limiters are adjusted based on the estimated passing bandwidth.

FIG. 2 shows a block diagram of an example embodiment of the network bandwidth distributor where some measured output bandwidths are used as basis for estimating the passing bandwidth and adjusting the output bandwidth limiters.

Traffic arriving at the physical input ports 13 flows into the logical input port 1, which contains an input traffic translator 3. Any number of physical input ports may be present; in this example, two are present.

The input traffic translator 3 modifies the traffic passing through the logical input port 1 according to the input traffic translation parameters 4.

After passing the logical input port 1, the traffic flows through the traffic distributor 5, which distributes the traffic to the logical output ports 10 according to the traffic distribution rules 6. Any number of logical output ports may be present; in this example, five are present.

Some of the logical output ports 10 contain a bandwidth limiter 9, which limits the outgoing traffic bandwidth as instructed by the bandwidth controller 11. Any number of the logical output ports may contain a bandwidth limiter; in this example, three of them do.

Some of the logical output ports 10 contain an output traffic translator 7, which modifies the traffic passing through the logical output port 10 according to the output traffic translation parameters 8. Any number of the logical output ports may contain an output traffic translator; in this example, two of them do.

Some of the logical output ports 10 contain a bandwidth measurer 16, which measures the traffic bandwidth as it passes the logical output port 10. Any number of the logical output ports may contain a bandwidth measurer; in this example, three of them do.

Traffic flowing out of the logical output ports 10 leave at the physical output ports 14. Any number of physical output ports may be present, and any number of the logical output ports may be connected to each of the physical output ports; in this example, three physical output ports exist, where two of them each have two logical output ports connected it and the third has one logical output port connected to it.

The bandwidth controller 11 periodically calculates the sum of the bandwidth measured by the bandwidth measurers 16 and compares the summed bandwidth to the predetermined bandwidth 12.

When the summed bandwidth is above the predetermined bandwidth 12, the bandwidth controller 11 may decrease the bandwidth of some or all of the bandwidth limiters 9.

When the summed bandwidth is below the predetermined bandwidth 12, the bandwidth controller 11 may increase the bandwidth of some or all of the bandwidth limiters 9.

The bandwidth controller 11 has a list of maximum bandwidth settings 15, which determines the maximum bandwidth the bandwidth controller 11 sets in each listed bandwidth limiter 9.

The input traffic translator 3 with its input traffic translation parameters 4 is optional.

The output traffic translator 7 with its output traffic translation parameters 8 is optional for each logical output port 10.

The bandwidth limiter 9 is optional for each logical output port 10.

The bandwidth measurer 16 is optional for each logical output port 10.

Using the distributor of FIG. 2, the behaviour described in relation to FIG. 1 may also be obtained.

The list of maximum bandwidth settings 15 is optional.

Figure 3:
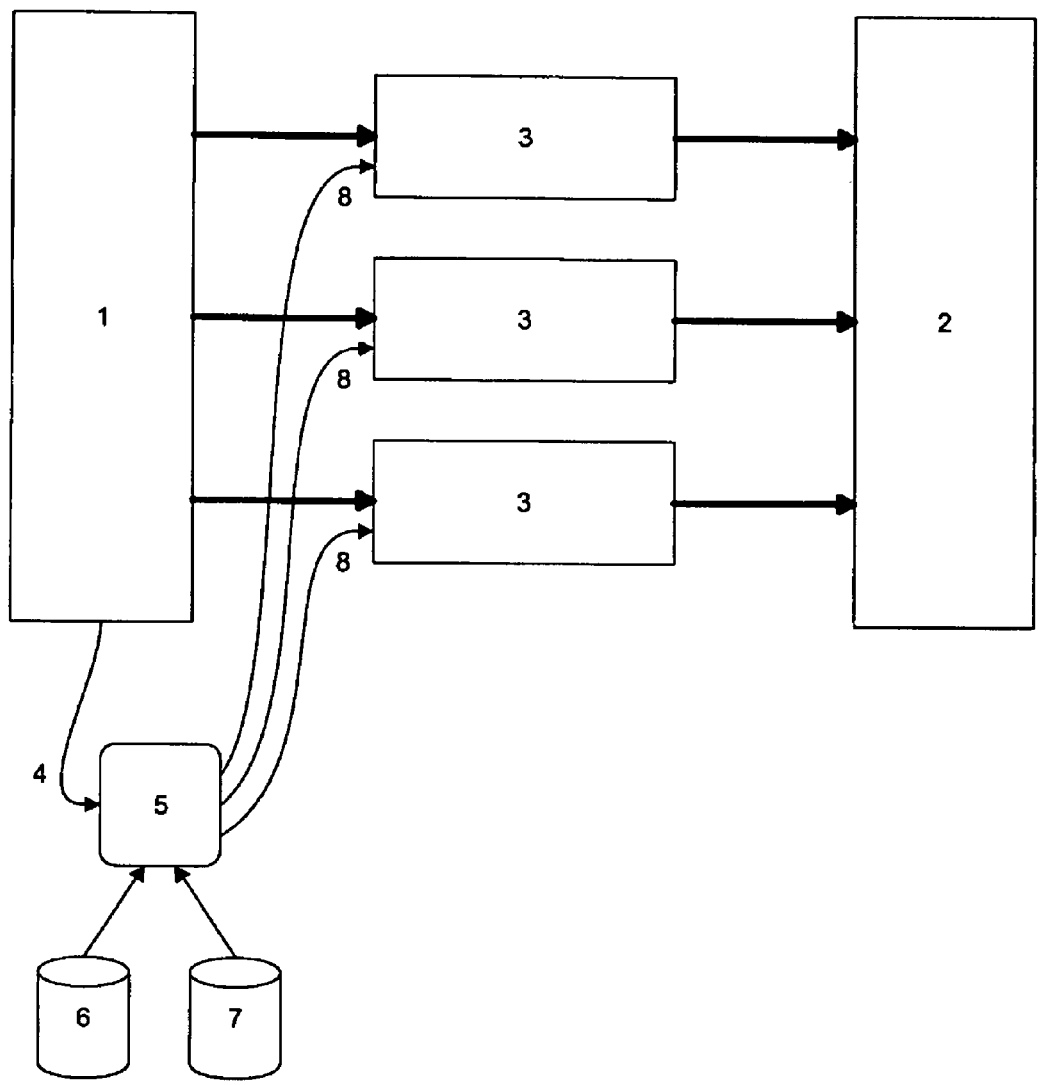
FIG. 3 shows a simplified block diagram of the network bandwidth distributor.

FIG. 3 shows a simplified block diagram of the network bandwidth distributor in an example embodiment with one port for receiving data from external entities, one port for sending data to local users and three buffers for forwarding data from the first port to the second port for a user.

Data is received from external entities by the first port 1 and temporarily stored per type of data in the buffer 3 corresponding to each type of data, until the buffer 3 forwards its stored data to the second port 2, which sends the data to the local users.

The bandwidth controller 5 compares the determined bandwidth 4 with which the first port 1 receives data to a predetermined percentage 6 of the total maximum bandwidth 7.

If the bandwidth 4 exceeds the predetermined percentage 6 of the total maximum bandwidth 7, the bandwidth 8 with which the buffers 3 can forward data to the local users is reduced.

The invention claimed is:

1. An apparatus for distributing bandwidth, the apparatus comprising:
   one or more first port(s) for receiving data from at least one external entity;
   one or more second port(s) for sending data received by the first port(s) to at least one local user;
   a device for determining a bandwidth with which the first port(s) receive data from the at least one external entity and comparing the bandwidth to a maximum bandwidth receivable by the first port(s); and
   a device for, if the determined bandwidth exceeds a threshold level percentage that is lower than 100% of the total reception bandwidth of the first port(s), dynamically adjusting allowable bandwidth of data flowing from the first port(s) to the second port(s) within the apparatus to control the data transmitted from the second port(s) to the at least one local user under a Transmission Control Protocol (TCP).

2. The apparatus according to claim 1, further comprising:
   a device for transferring data from the first port(s) to the second port(s).

3. The apparatus according to claim 1, wherein the device for determining the bandwidth is adapted to deter mine the bandwidth at regular intervals or constantly, and wherein the dynamically adjusting device is adapted to perform the dynamically adjusting at regular intervals or constantly.

4. The apparatus of claim 1, wherein
   the one or more first port(s) are also for sending data to the at least one external entity, and
   the one or more second port(s) are also for receiving data from the at least one local user to be sent by the first port(s).

5. The apparatus according to claim 4, further comprising:
   a device for transferring data from the first port(s) to the second port(s).

6. The apparatus according to claim 4, wherein the device for determining the bandwidth is adapted to determine the bandwidth at regular intervals or constantly, and wherein the dynamically adjusting device is adapted to perform the dynamically adjusting at regular intervals or constantly.

7. A method of distributing bandwidth on one or more first port(s), which receive data from at least one external entity, and one or more second port(s), which send data received by the first port(s) to at least one local user, the method comprising:
   determining, by a device, a bandwidth with which the first port(s) receive data from the at least one external entity and comparing the bandwidth to a maximum bandwidth receivable by the first port(s); and
   if the bandwidth exceeds a threshold level percentage that is lower than 100% of the total reception bandwidth of the first port(s), dynamically adjusting allowable bandwidth of data flowing from the first port(s) to the second port(s) within the device to control the data transmitted from the second port(s) to the at least one local user under a Transmission Control Protocol (TCP).

8. The method according to claim 7, wherein the determining determines the bandwidth at regular intervals or constantly, and wherein the dynamically adjusting performs the dynamically adjusting at regular intervals or constantly.

9. The method according to claim 7, wherein the one or more first port(s) also send data to at least one external entity, and the one or more second port(s) also receive data from the at least one local user to be sent by the first port(s).

10. The method according to claim 9, wherein the determining determines the bandwidth at regular intervals or constantly, and wherein the dynamically adjusting performs the dynamically adjusting at regular intervals or constantly.

11. An assembly, comprising:
    an apparatus including:
       one or more first port(s) for receiving data from at least one external entity; and
       one or more second port(s) for sending data received by the first port(s) to at least one local user;
    wherein:
       the at least one local user is adapted to transmit, to the at least one external entity, data indicating a bandwidth with which the at least one local user receives data from the at least one external entity;
       the at least one external entity is adapted to receive the data and forwards data to at least one of the first port(s) with the bandwidth determined by the indicated bandwidth;
    the apparatus further including:
       a device for determining the bandwidth with which the first port(s) receive data from the at least one external entity and comparing the bandwidth to a maximum bandwidth receivable by the first port(s); and
    a device for, if the bandwidth exceeds a threshold level percentage that is lower than 100% of the total reception bandwidth of the first port(s), dynamically adjusting allowable bandwidth of data flowing from the first port(s) to the second port(s) within the apparatus to control the data transmitted from the second port(s) to the at least one local user.

12. The assembly according to claim 11, wherein the apparatus further comprises:
    a device for transferring data from the first port(s) to the second port(s).

13. The assembly according to claim 11, wherein the determining device is adapted to determine the bandwidth at regular intervals or constantly, and wherein the dynamically adjusting device is adapted to perform the dynamically adjusting at regular intervals or constantly.

14. A method of bandwidth, including:
    at least one local user communicating with at least one external entity via an device having:
       one or more first port(s) receiving data from the at least one the external entity, the first port(s) having a maximum receivable bandwidth; and
       one or more second port(s) sending data received by the first port(s) to the at least one the local user;
    the at least one local user transmits to the at least one external entity data indicating a bandwidth with which the at least one local user receives data from the at least one external entity; and the at least one external entity receives the data and forwards the data to at least one first port with the bandwidth determined by the indicated bandwidth; the method comprising:

determining the bandwidth with which the first port(s) receive data from the at least one external entity and comparing the bandwidth to the maximum bandwidth receivable by the first port(s), and if the bandwidth exceeds a threshold level percentage that is lower than 100% of the bandwidth receivable by the first port(s), dynamically adjusting allowable bandwidth of data flowing from the first port(s) to the second port(s) within the apparatus to control the data transmitted from the second port(s) to the at least one local user.

15. The method according to claim 14, wherein the determining determines the bandwidth at regular intervals or constantly, and wherein the dynamically adjusting performs the dynamically adjusting at regular intervals or constantly.

16. The assembly according to claim 11, wherein the data is transmitted from the second port(s) to the at least one local user under a Transmission Control Protocol (TCP).

17. The method according to claim 14, wherein the data is transmitted from the second port(s) to the at least one local user under a Transmission Control Protocol (TCP).

* * * * *